United States Patent
Kelly et al.

[11] 3,845,558
[45] Nov. 5, 1974

[54] DENTURE LINER

[76] Inventors: Daniel E. Kelly, 2727 N.W. 167th St., Miami, Fla. 33169; Robert W. Theed, 9010 S.W. 77th Ave., South Miami, Fla. 33156; Martin Beckerman, 2734 N.W. 183rd St., North Miami Beach, Fla. 33169

[22] Filed: Aug. 6, 1973

[21] Appl. No.: 385,799

[52] U.S. Cl. .................................................... 32/3
[51] Int. Cl. ........................................... B61c 13/24
[58] Field of Search ........................................ 32/3

[56] References Cited
UNITED STATES PATENTS

| | | | |
|---|---|---|---|
| 1,539,143 | 5/1925 | Petry | 32/2 |
| 1,607,212 | 11/1926 | Petry | 32/2 |

*Primary Examiner*—Robert Peshock
*Attorney, Agent, or Firm*—Clarence A. O'Brien; Harvey B. Jacobson

[57] ABSTRACT

A liner panel is provided and constructed of soft, flexible and resilient and somewhat deformable material. The panel includes a first side for opposing and anchoring to the gum opposing surfaces of a full or partial denture and a second side for opposing and contact with the gum tissue over which a full or partial denture is to be placed. The second gum tissue opposing side of the panel includes at least one area thereof defining an area of the panel from whose opposite first side an integral stem portion projects outwardly and is anchored to the opposing full or partial denture. When the second gum tissue opposing side of the liner panel is dampened, as by saliva, and placed against gum tissue as the associated full or partial denture is placed into proper position substantially all air between the aforementioned area of the second gum tissue opposing side of the liner panel and the opposing gum tissue is expressed therefrom. Thereafter, although when the associated denture is in fully seated position there is no vacuum formed between the aforementioned area of the second gum tissue opposing side of the liner panel and the gum tissue, if there is a tendency for the denture to be pulled away from the gum tissue initial movement of the denture stem portion thereof and to the central portion of the aforementioned area in contact with the gum tissue. However, the peripheral edges of the central area are sealed relative to the gum tissue by saliva against the entrance of air between the gum tissue and the aforementioned area of the second side of the liner panel with the result that a substantially complete vacuum is formed in the central portion of the aforementioned area of the second side of the liner panel transforming that area of the panel into a suction cup whereby further movement of the denture away from the gum is prevented.

17 Claims, 16 Drawing Figures

DENTURE LINER

The denture liner of the instant invention has been specifically designed to provide a liner, which through mechanical distortion, will create vacuum recesses in the central portions of surface portions of the liner adapted to contact gum tissue. The mechanical distortion results when there is a tendency for the denture to be pulled away from the gum and the initial movement of the denture away from the gum tissue is transmitted from the denture through the aforementioned stem portion of the liner and to the central portion of the gum tissue engaging surface portion of the liner.

The denture liner is designed to provide a liner which gives the same results as a suction cup-equipped liner in order to resist movement of a denture away from the gum tissue against which the liner is normally seated, but with the liner constructed in a manner whereby it does not begin to function as a suction cup or a plurality of suction cups until such time as a force is applied to the denture to shift it away from the gum tissue against which it is seated.

Heretofore various forms of suction cup defining dentures and denture liners have been patented. Examples of this utilization of suction cup structures may be found in U.S. Pat. Nos. 990,000, 1,441,384, 1,462,888, 1,463,968 and 2,867,903.

These previously patented dentures and liners equipped with suction cups are undoubtedly capable of performing the function of assisting in retaining an associated liner seated against opposing gum tissue. However, these previous suction cup equipped dentures and denture liners are constructed in a manner such that a vacuum is maintained at all times in the suction cup defining areas thereof with the result that negative pressure is applied to the opposing gum tissue with deleterious effects. The gum tissue subject to negative pressure is drawn into the suction cup defining areas and sores are quickly formed as a result.

However, as above set forth, the denture liner of the instant invention is constructed in a manner whereby certain areas thereof, as a result of the slightest movement of the associated denture away from the opposing gum tissue, creates a vacuum to retain the denture in position, but only when pressure is applied to the associated liner in a direction to unseat the liner from the opposing gum tissue surfaces. Otherwise, the areas of the denture liner contacting opposing gum tissue merely rest against the gum tissue without a vacuum being formed. In this manner, so long as no pressure is applied to the denture to shift it away from the gum, the liner gum tissue contacting portions remain in a neutral or inactive status insofar as the formation of suction cups is concerned.

In order to distinguish between the instant invention and the devices which incorporate suction cups, it must be recognized that although both the instant invention and conventional suction cup defining liners may be constructed of a flexible material having a inate memory and which tends to retain or return to its original shape, the instant invention provides merely gum tissue shape conforming surface portions for contact with the gum tissue and which are transformed into suction cup areas only as a result of the denture being shifted away from the opposing gum tissue. When the gum tissue engaging surface portions are centrally distorted so as to be transformed into suction cups, the outer marginal portions of the gum tissue engaging surface portions remain sealed relative to the damp gum tissue.

In contrast to the instant invention which merely rests against gum tissue until such time as the associated denture is shifted away from the gum tissue, when a suction cup defining denture liner is used the air is forced from beneath the suction cup or cups by flattening the latter. Then, when the memory of the flexible material attempts to return to its static cup shape, the volume of air under the flattened portion is increased and a constant partial vacuum is created between the suction cup and the opposing gum tissue. This continuous partial vacuum in most cases causes deleterious effects on the opposing gum tissue.

The main object of this invention is to provide a denture liner which will be capable of acting in the manner of one or more suction cups to resist unseating of a full or partial denture from the opposing gum tissue surfaces when force is applied to the full or partial denture to move the latter away from the opposing gum tissue.

Another object of this invention, in accordance with the immediately preceding object, is to provide a denture liner which will in no way function as one or more suction cups without a force being applied to the denture liner in a direction to shift it away from the opposing gum tissue portions.

A final object of this invention to be specifically enumerated herein is to provide a denture liner panel which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 11:
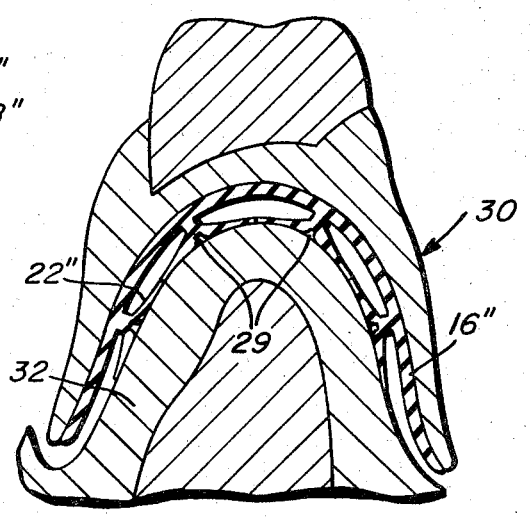
FIG. 11 is an enlarged fragmentary sectional view similar to FIG. 4 but illustrating the use of the third form of denture liner panel illustrated in FIGS. 9 and 10.
Figure 12:
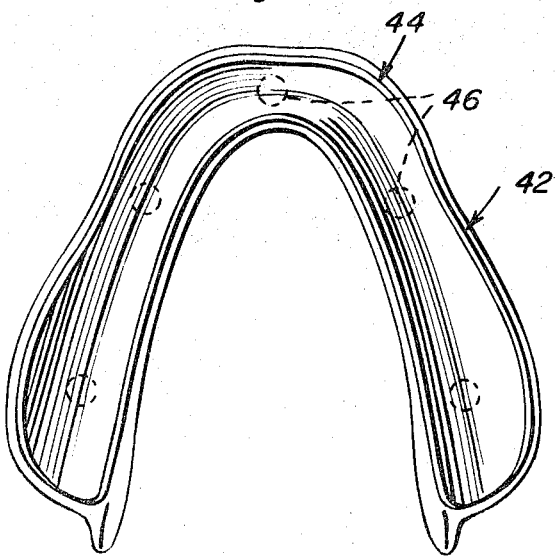
FIG. 12 is a bottom plan view of a lower denture utilizing a fourth form of denture liner.
Figure 13:
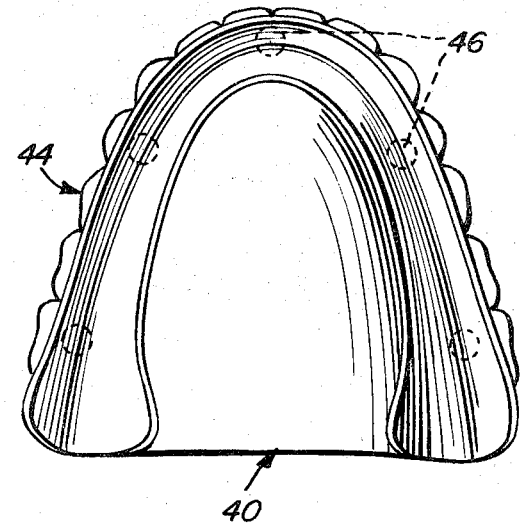
FIG. 13 is a top plan view of an upper denture utilizing the fourth form of denture liner.
Figure 14:
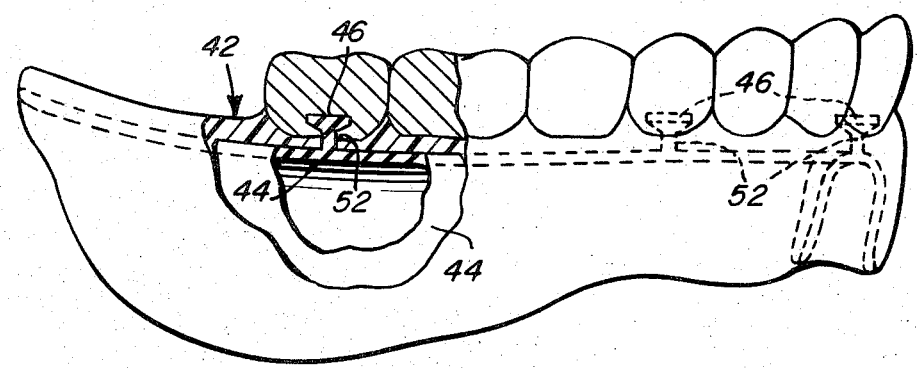
FIG. 14 is an enlarged side elevational view of the lower denture illustrated in FIG. 12 and with portions of the denture and fourth form of denture liner panel being broken away and illustrated in vertical section.
Figure 15:
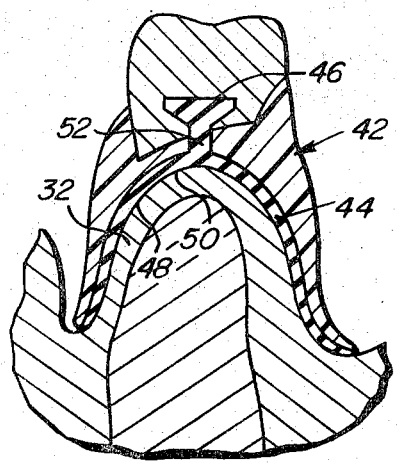
Figure 16:
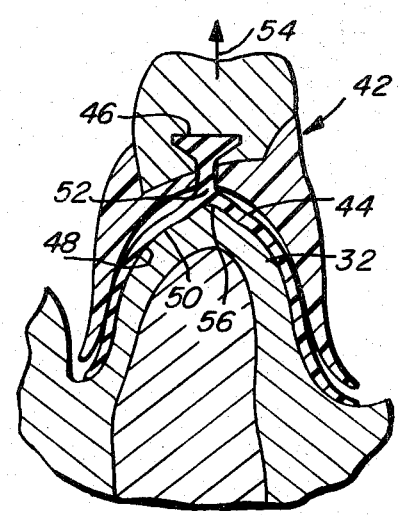

FIG. 15 is a fragmentary enlarged vertical sectional view similar to FIG. 11 but with the lower denture utilizing the fourth form of denture liner illustrated in FIGS. 12, 13 and 14; and FIG. 16 is a fragmentary enlarged vertical sectional view similar to FIG. 15 but with the lower denture having upward pressure applied thereto and the fourth form of denture liner supported therefrom acting in the manner of a suction cup to resist upward movement of the denture.

Referring now more specifically to the drawings the numeral 10 generally designates a conventional form of full upper denture having a first form of denture liner of the instant invention referred to in general by the reference numeral 12 operatively associated therewith. The denture liner 12 comprises a panel member 16 constructed of soft, flexible, resilient and somewhat deformable material. The panel member includes a first denture abutting side 18 and a second gum tissue opposing side 20. The panel member 16 may have its first denture abutting side 18 secured to the upper surface of the full upper denture 10 in any convenient manner. The second gum tissue opposing side 20 of the panel 16 includes a plurality of spaced gum tissue engageable portions 22 formed integrally with the panel member 16 and supported in spaced relation outwardly of the main portion 24 of the panel or panel member 16 by means of integral stem portions 26 extending between the portions 22 and the main portion 24 with the stem portions or shank portions 26 generally centered relative to the gum tissue engaging portions 22.

Figure 1:
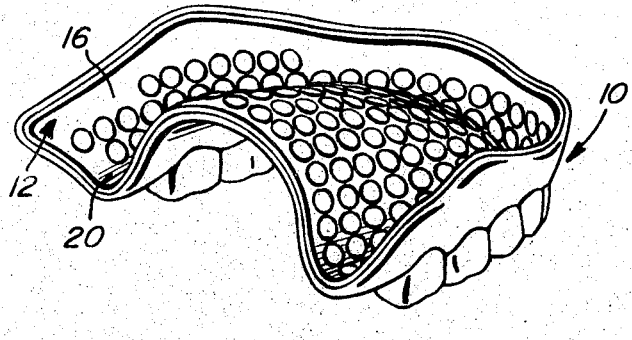
FIG. 1 is a perspective view of a full upper denture with a first form of liner panel of the instant invention secured to the denture.

The outer surface portions 28 of the gum tissue engaging portions 22 are substantially flat and it may be seen from FIG. 1 of the drawings that the gum tissue engaging portions 22 may be spaced over the second gum tissue opposing side 20 of the panel member 16 as desired.

With attention now invited more specifically to FIGS. 2 through 5 of the drawings, there may be seen a lower denture referred to in general by the reference numeral 30 and which is provided with a second liner 12 of somewhat different configuration than the liner 12 carried by the denture 10, but which is otherwise identical.

Figure 4:
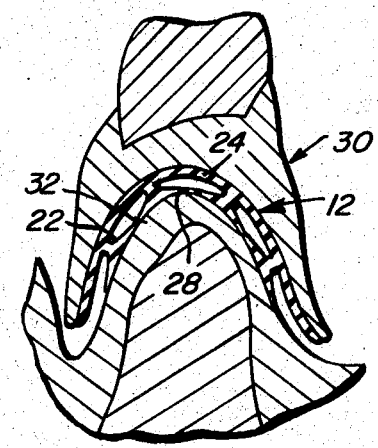
FIG. 4 is an enlarged fragmentary sectional view illustrating the lower denture of FIG. 2 in position seated against opposing gum tissues.
Figure 2:
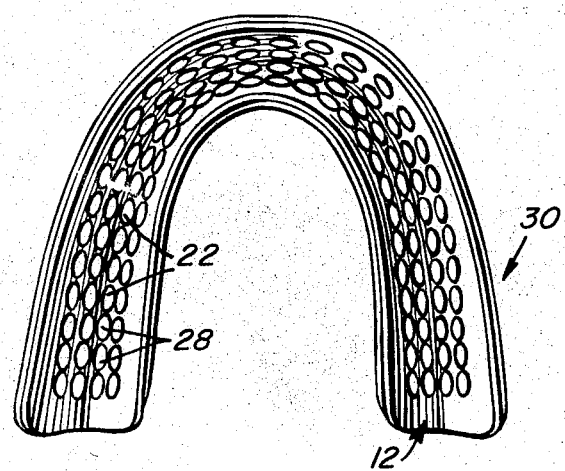
FIG. 2 is a bottom view of a full lower denture with a liner panel similar to that illustrated in FIG. 1 secured thereto.

In FIG. 4 of the drawings the denture 30 is illustrated in a seated position against the opposing gum tissue 32, the spacing between the main body portion 24 of the liner 12 illustrated in FIG. 4 and the gum tissue 32 being slightly exaggerated for the purpose of illustration. It is to be understood that when the denture 30 provided with the liner 12 is seated against the gum tissue 32 saliva on the gum tissue 32 fully wets the outer surface portions 28 of the gum tissue engaging portions 22 so that as the denture 30 is seated in position all air disposed between the outer surface portions 28 and the wetted gum tissue 32 is expressed therefrom.

Figure 5:
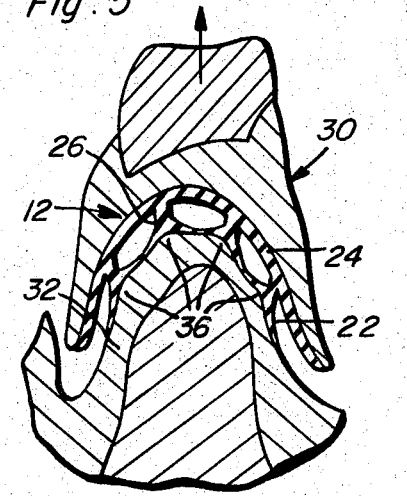
FIG. 5 is a sectional view similar to FIG. 4 but with an upward force being applied to the lower denture to illustrate the manner in which the gum tissue opposing surfaces of the liner are transformed into suction cups in order to resist movement of the denture away from the opposing tissue surfaces, the spacing between the liner panel and the gum tissue being exaggerated.
Figure 3:
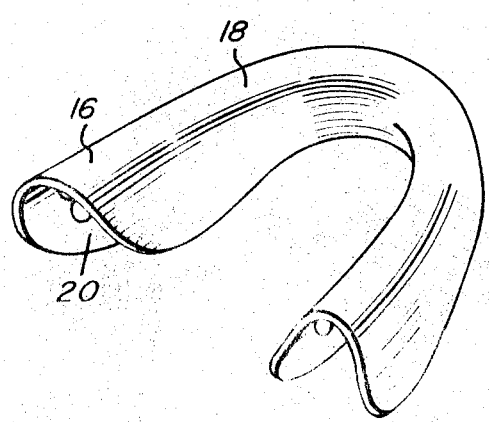
FIG. 3 is a perspective view of the liner panel of FIG. 2 removed from the lower denture and as seen from above.
Figure 6:
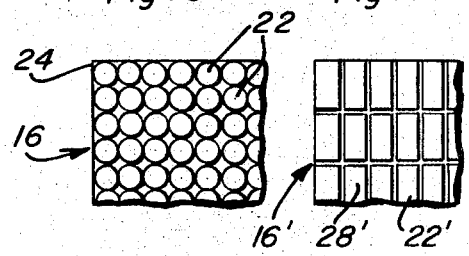
FIG. 6 is a plan view of a section of the panel material illustrated in FIGS. 1 through 5.

During normal usage of the denture 30 the outer surface portions 28 of the liner 12 merely rest upon the opposing gum tissue 32 without a negative pressure being developed between the outer surface portions 28 and the gum tissue 32. However, as illustrated in FIG. 5 of the drawings, should an upward force be directed upon the denture 30 initial upward movement of the denture 30 will shift the main portion 24 of the denture liner 12 away from the gum tissue 32 and the stem or shank portions 26 will attempt to pull the central areas of the gum tissue engaging portions 22 away from the gum tissue 32. However, the outer peripheral edges of the outer surface portions 28 are wetted and disposed against the gum tissue 32 with the result that any attempt to move the central portions of the gum tissue engaging portions 22 away from the gum tissue 32 results in the formation of a substantially total vacuum in the central areas of the outer surface portions 28 so that the opposing gum tissue portions 36 are drawn up into the central areas of the gum tissue engaging portions 22 which are by now slightly cupped. The reduced pressure zones formed in the central portions of the gum tissue engaging portions 22 effectively resist further upward movement of the denture 30 from the gum tissue 32.

Should the upward force on the liner 30 be terminated, the resiliency of the stem or shank portions 26 pulls the main portion 24 of the liner 12 back down toward the gum tissue 32 until the denture 30 is in the position thereof illustrated in FIG. 4. Of course, when the liner 30 has returned to the position illustrated in FIG. 4 the reduced pressure zones at 36 cease to exist and the denture 30 is merely supported from the gum tissue 32 by engagement of the outer surface portions 28 with the gum tissue 32.

It may thus be seen that the liners 12 may be utilized in the manner of suction cups to prevent the dentures 10 and 30 from being pulled away from opposing gum tissue portions and yet that the liners 12 do not function in the manner of suction cups when the dentures 10 and 30 are not being urged away from the opposing gum tissues. This enables the liners 12 to be effectively used without causing sores to be formed on the gum tissue 32.

Figure 7:
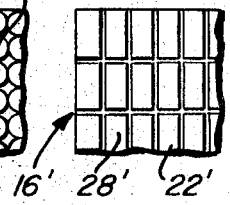
FIG. 7 is a plan view of a sample of a slightly modified liner panel wherein the gum tissue contacting areas thereof are rectangular in plan shape as opposed to the circular gum tissue contacting areas of the liner panel illustrated in FIGS. 1 through 6.
Figure 8:
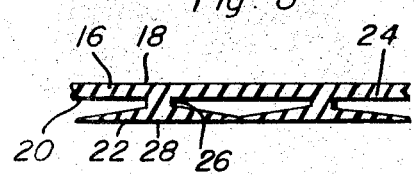
FIG. 8 is a fragmentary enlarged sectional view of the denture liner panel section illustrated in FIG. 6 and which is also representative of a similar sectional view of the denture liner panel section illustrated in FIG. 7.

In FIG. 7 of the drawings it may be seen that a liner panel member 16' may be provided which is substantially identical to the liner panel member 16, except that the gum tissue engaging portions 22' and outer surface portions 28' thereof are rectangular in plan shape as opposed to circular.

Figure 9:
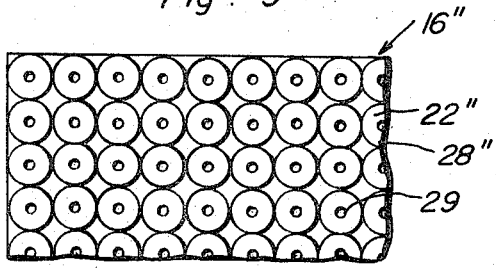
FIG. 9 is a fragmentary plan view of a third form of denture liner panel with the central portions of the gum contacting areas thereof provided with small saliva retaining recesses.
Figure 10:
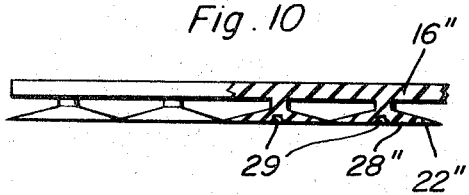
FIG. 10 is a fragmentary enlarged side elevational view of the panel section illustrated in FIG. 9 and with portions thereof being broken away and illustrated in vertical section.

From FIGS. 9, 10 and 11 it may also be seen that a third form of panel member 16'' may be utilized and that the gum tissue engaging portions 22'' thereof are circular and thus similar to the gum tissue engaging portions 22. However, the outer surface portions 28" of the gum tissue engaging portions 22" include central recesses 29 which function as reservoirs for saliva to assist in maintaining the outer surface portions 28" and the opposing gum tissue surfaces wetted. From FIG. 11 of the drawings it may be seen that when the denture 30 is provided with a denture liner utilizing the panel member 16" the gum tissue engaging portions 22" support the liner 30 from the gum tissue 32 in substantially the same manner as the gum tissue engaging portions 22, except that the recesses 29 define the aforementioned saliva reservoirs.

With reference now more specifically to FIGS. 12 through 16 of the drawings, there may be seen upper and lower dentures referred to in general by the reference numerals 40 and 42. The upper and lower dentures 40 and 42 have denture liners 44 operatively associated therewith. As may be seen from FIGS. 14, 15 and 16 of the drawings the denture 42 has the denture liner 44 disposed therein. The liner 44 includes a first denture engaging surface 46 corresponding to the denture abutting surface 18 and a second gum tissue opposing surface 48. The gum tissue opposing surface 48 includes gum tissue engaging portions 50 corresponding to the portions 22 which are defined by areas of the liner 44 from whose reverse surface integral stem portions 52 extend outwardly. The denture abutting or engaging surfaces 46 are carried by the outer ends of the stem or shank portions 52 and are embedded in the denture 42.

When the denture 42 is fully seated against the gum tissue 32 as illustrated in FIG. 15 of the drawings all air disposed between the outer surface portion 50 and the gum tissue 32 is expressed therefrom and a thin layer of saliva is present between the gum tissue 32 and the liner 44. On the other hand, when an upward force is applied to the denture 42 in the manner illustrated by the arrow 54 in FIG. 16 the shank portion 52 is slightly stretched and attempts to pull the central portion of the outer surface portion 50 away from the gum tissue 32 and thus forms a negative pressure area at 56 in substantially the same manner the negative pressure areas 36 are formed when the denture 30 in FIG. 5 is urged upwardly away from the gum tissue 32. Thus, although the denture liner 44 operates on somewhat of a reverse principle, when the denture 42 is fully seated as illustrated in FIG. 15 of the drawings there is no negative pressure between the gum tissue 32 and the outer surface portion 50 of the liner 44. However, when the denture liner 42 is urged upwardly as illustrated in FIG. 16, a negative pressure area is defined at 56 to thus resist displacement of the denture 42 away from the gum tissue 32.

Of course, the gum tissue engaging surface area of the liner which may be transformed into a suction cup may be of substantially any shape and range in size from very small gum tissue engaging areas to the substantially full surface area of the form illustrated in FIGS. 12 through 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a denture plate including one side adapted to oppose gum tissues against which the plate is to be seated, a denture liner including a plurality of panel portions, each panel portion including a generally smooth outer side for opposing and direct contact with a wetted gum tissue area and an opposite side opposing said one side of said plate, each panel portion including a centrally disposed integral stem portion projecting outwardly from said opposite side thereof and anchored, at its end remote from said panel portion, to said one side of said plate, said panel portions and said stems being integrally formed of a soft, flexible and resilient material, said outer sides of said panel portions being of a contour for sustantially full light surface-to-surface contact with opposing wetted gum tissue surfaces to the exclusion of substantially all air from between said gum tissue surfaces and said outer sides and independent of negative pressures being formed between said outer sides and said gum tissue surfaces.

2. The combination of claim 1 wherein said panel portions comprise integral portions of a panel member supported in slightly spaced relation outwardly of the one side of said plate by means of said stem portions.

3. The combination of claim 1 wherein said portions of said panel member comprise spaced areas of a one-piece panel member, said stem portions projecting outwardly from said panel member and having their outer ends anchored directly to said one side of said denture plate.

4. The combination of claim 3 wherein said outer ends of said stem portions include outer terminal ends embedded in said plate.

5. The combination of claim 4 wherein said outer terminal ends are transversely enlarged.

6. The combination of claim 1 wherein said gum portions of said panel member comprise spaced areas of a one-piece panel member, said stem portions projecting outwardly from said panel member and having their outer ends anchored to said one side of said denture plate, said gum tissue engaging area portions being spaced on said panel member so as to be spaced along the central portion of the alveolar ridge receiving channel of the denture plate.

7. The combination of claim 1 including a panel member having a first side thereof overlying and secured to at least a majority of said one side of said denture plate and a second side for opposing gum tissue, said gum tissue engaging portions being slightly spaced from and spaced over at least a major portion of the second gum tissue opposing side of said panel member and supported therefrom by said stem portions with the latter formed integrally with said panel member.

8. The combination of claim 1 wherein said gum tissue engaging portions are generally circular in plan shape.

9. The combination of claim 1 wherein said gum tissue engaging portions are generally polygonal in plan shape.

10. The combination of claim 9 wherein said gum tissue engaging portions are rectangular in plan shape.

11. The combination of claim 1 wherein said outer sides of said panel portions are generally flat.

12. The combination of claim 1 wherein said outer sides of said panel portions are generally flat, but include a central depression defining a saliva reservoir.

13. A liner for a denture plate, said liner comprising a panel member constructed of soft, flexible and resilient material, said panel member including a first side adapted to oppose a denture plate and a second side adapted to oppose gum tissue against which the plate is to be seated with the panel member sandwiched between the plate and gum tissue, said first side being adapted to be anchored to said plate and said second side including a plurality of spaced outwardly projecting integral stem portions whose outer ends are laterally enlarged in order to define thin gum tissue engaging panel portions generally centered on the outer ends of said stem portions and lying in planes disposed generally normal to said stem portions, the outer sides of said panel portions being contoured for substantially full light surface-to-surface contact with opposing wetted gum tissue to the exclusion of substantially all air from between said gum tissue and said outer sides independent of negative pressures being formed therebetween.

14. The combination of claim 13 wherein the outer surfaces of said gum tissue engaging portions are substantially flat.

15. The combination of claim 13 wherein the outer surfaces of said gum tissue engaging portions are substantially flat, but include small central depressions aligned with the outer ends of said stem portions and define saliva reservoirs.

16. A liner for a denture plate, said liner comprising a panel member constructed of soft, flexible and resilient material, said panel member including a first side adapted to oppose a denture plate and a second side adapted to oppose gum tissue against which the plate is to be seated with the panel member sandwiched between the plate and gum tissue, and said first side including a plurality of spaced outwardly projecting integral stem portions whose outer ends are adapted to be anchored to the gum tissue opposing side of a denture plate.

17. In combination with a denture including a first gum tissue opposing side, a short shank constructed of flexible, shape retentive and resilient material, one end of said shank being anchored to said first side of said denture with the other end thereof projecting outwardly of said first side and provided with an integral panel-like portion disposed in a plane generally normal to said shank and having a generally flat outer surface facing away from said first side of said denture, said material being at least substantially fluid impervious.

* * * * *